United States Patent
Sugimura

(10) Patent No.: US 6,374,034 B1
(45) Date of Patent: Apr. 16, 2002

(54) DIGITAL VTR WITH MEMORY TO CAPTURE VIDEO DATA WHILE THE VIDEO TAPE REWINDS

(75) Inventor: Yukio Sugimura, Suita (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/274,769

(22) Filed: Mar. 24, 1999

(30) Foreign Application Priority Data

Mar. 25, 1998 (JP) ............................................ 10-077420

(51) Int. Cl.[7] ................................................. H04N 5/91
(52) U.S. Cl. ........................... 386/81; 386/46; 386/117; 386/124
(58) Field of Search ............................ 386/46, 96, 107, 386/108, 117, 81, 124; 360/73.06, 72.3, 5; 348/143; H04N 5/91

(56) References Cited

U.S. PATENT DOCUMENTS

| | | | | |
|---|---|---|---|---|
| 4,808,992 A | * | 2/1989 | Beyers, Jr. et al. | 386/96 |
| 5,032,937 A | * | 7/1991 | Suzuki et al. | 360/73.06 |
| 5,257,142 A | * | 10/1993 | Hong | 386/46 |
| 5,408,330 A | * | 4/1995 | Squicciarini et al. | 386/107 |
| 5,999,690 A | * | 12/1999 | Ro | 386/46 |

* cited by examiner

Primary Examiner—Vincent F. Boccio
(74) Attorney, Agent, or Firm—Armstrong, Westerman & Hattori, LLP

(57) ABSTRACT

A digital VRT according to the present invention comprises means for intermittently writing an image picked up by a video camera into a memory, means for reading out, every time image data corresponding to a predetermined recording unit are stored in the memory, the image data corresponding to the recording unit from the memory and recording the image data on a video tape, and means for automatically rewinding the video tape to its beginning-of-tape when it is detected that the remaining amount of the video tape is not more than a predetermined amount. The image data written into the memory while the video tape is being rewound is recorded on the video tape after the rewinding.

6 Claims, 4 Drawing Sheets

DIGITAL VTR WITH MEMORY TO CAPTURE VIDEO DATA WHILE THE VIDEO TAPE REWINDS

BACKGROUND OF THE INVENTION

1. Field of the Invention

The present invention relates to a digital VTR.

2. Description of the Prior Art

An analog VTR (Video Tape Recorder) for recording an image picked up by a monitoring camera on a video tape intermittently (in a time-lapse manner) at a rate of one field per predetermined several fields has already been developed.

In this type of analog VTR, when the image has been recorded to the end-of-tape of the video tape, a rewinding operation (RWD) is automatically performed. When the video tape is rewound to its beginning-of-tape, a recording operation is automatically started again.

In the above-mentioned conventional analog VTR, the image picked up by the monitoring camera is not recorded on the video tape during the rewinding operation.

SUMMARY OF THE INVENTION

An object of the present invention is to provide a digital VTR capable of recording an image picked up by a monitoring camera on a video tape while the video tape is being rewound.

A first digital VTR according to the present invention is characterized by comprising image data storage means for intermittently writing an image picked up by a video camera into a memory, image data recording means for reading out, every time image data corresponding to a predetermined recording unit are stored in the memory, the image data corresponding to the recording unit from the memory, and recording the image data on a video tape, detection means for detecting that the remaining amount of the video tape is not more than a predetermined amount, and means for automatically rewinding the video tape to its beginning-of-tape when it is detected that the remaining amount of the video tape is not more than the predetermined amount. The image data written into the memory while the video tape is being rewound can be recorded on the video tape after the rewinding.

A second digital VTR according to the present invention is characterized by comprising image data storage means for intermittently writing an image picked up by a video camera into a memory, image data recording means for reading out, every time image data corresponding to a predetermined recording unit are stored in the memory, the image data corresponding to the recording unit from the memory, and recording the image data on a video tape, detection means for detecting that the remaining amount of the video tape is not more than a predetermined amount, and means for reading out, when it is detected that the remaining amount of the video tape is not more than the predetermined amount, all the image data, which have not been recorded yet, stored in the memory, recording the image data on the video tape, and then rewinding the video tape to its beginning-of-tape. The image data written into the memory while the video tape is being rewound can be recorded on the video tape after the rewinding.

An example of the detection means is one for detecting that the remaining amount of the video tape is not more than the predetermined amount on the basis of the ratio of the number of revolutions of a feed reel to the number of revolutions of a take-up reel.

An example of the detection means is one for measuring the remaining amount of the video tape by feeding the video tape to its end-of-tape and rewinding the video tape to its original position when the image data is not recorded on the video tape, and detecting that the remaining amount of the video tape is not more than the predetermined amount on the basis of the results of the measurement.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
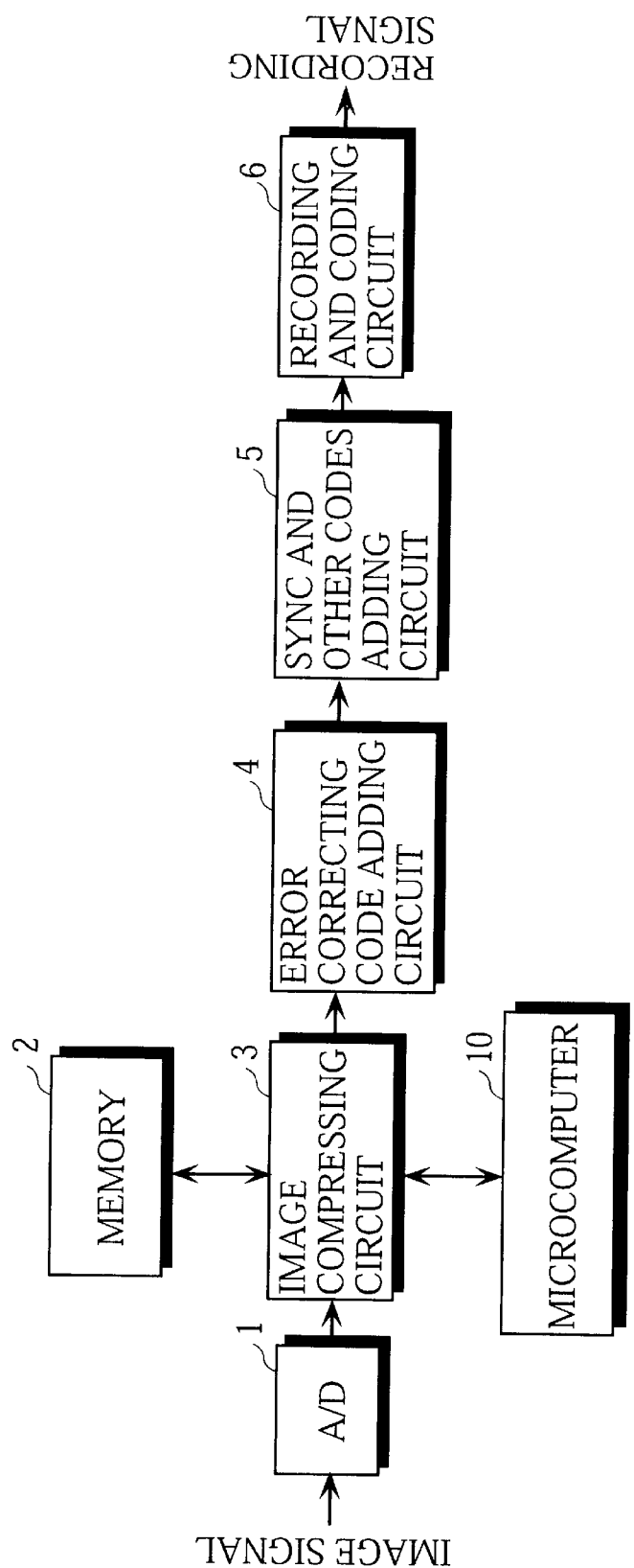
FIG. 1 is a block diagram showing the schematic configuration of a digital VTR.

Referring now to the drawings, an embodiment of the present invention will be described.

FIG. 1 illustrates the configuration of a digital VTR for intermittently recording an image picked up by a monitoring camera on a video tape and reproducing the image recorded on the video tape. FIG. 1 illustrates only a circuit for recording an image.

The digital VTR comprises an analog-to-digital (A/D) converter 1 for converting an image signal from a monitoring camera (a video camera) into a digital signal, a memory 2 for temporarily storing digital image data obtained by the A/D converter 1, an image compressing circuit 3 for subjecting an image stored in the memory 2 to image compression such as JPEG (Joint Photographic Experts Group) or MPEG (Motion Picture Expert Group), an error-correcting code adding circuit 4 for adding an error-correcting code to coding data obtained from the image compressing circuit 3, an SYNC and other codes adding circuit 5 for adding codes such as SYNC (synchronous) and ID (identification), and a recording and coding circuit 6.

The image compressing circuit 3 and the memory 2 are controlled by a microcomputer 10.

In this example, an image signal corresponding to 60 fields per second is inputted to the A/D converter 1. The memory 2 has a capacity capable of storing image data corresponding to 240 fields. The image data are written into the memory 2 at a rate of one field per second.

Every time the image data corresponding to 240 fields (image data corresponding to one recording unit) are stored in the memory 2, that is, every four minutes, the data are read out, and are recorded on the video tape through the image compressing circuit 3, the error-correcting code adding circuit 4, the SYNC and other codes adding circuit 5, and the recording and coding circuit 6. Time required to record the image data corresponding to 240 fields on the video tape is approximately four seconds. Even during the recording operation (during a period of reading), the image data are written.

The image data corresponding to 240 fields are thus collectively recorded on the video tape every other predetermined time. Consequently, the video tape is also intermittently fed in synchronization with the recording operation. Time required until the video tape is rewound from its end-of-tape to its beginning-of-tape (hereinafter referred to as time for rewinding) shall be less than four minutes.

The microcomputer carries out processing for detecting the remaining amount of the tape, processing for controlling the writing of the image data into the memory 2, and processing for controlling the reading of the image data from the memory 2.

In the processing for controlling the writing of the image data into the memory 2, the image data outputted from the A/D converter 1 are written into the memory 2 at a rate of one field per second.

Figure 2:
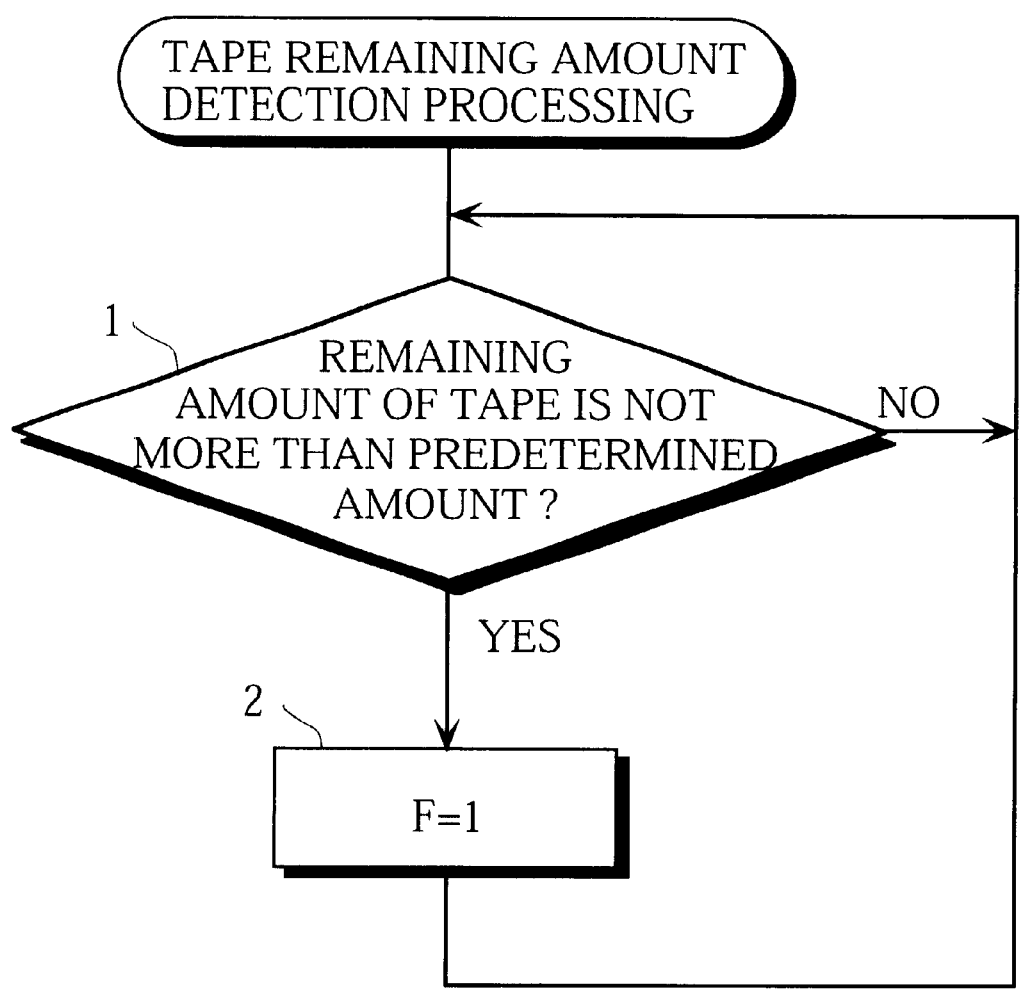
FIG. 2 is a flow chart showing processing for detecting the remaining amount of a tape.

FIG. 2 shows the procedure for the processing for detecting the remaining amount of the tape.

In the processing for detecting the remaining amount of the tape, it is judged whether or not the remaining amount of the video tape is not more than a predetermined amount on the basis of the ratio of the number of revolutions of a feed reel to the number of revolutions of a take-up reel (step 1). The predetermined amount is set to an amount slightly larger than the amount of the image data corresponding to one recording unit (the amount of the image data corresponding to 240 fields). The reason for this will be described later.

When the remaining amount of the video tape is more than the predetermined amount, the program is returned to the step 1. That is, it is judged whether or not the remaining amount of the video tape is not more than the predetermined amount at predetermined time intervals. When it is judged that the remaining amount of the video tape is not more than the predetermined amount, a flag F indicating that there is no remaining amount is set (F=1) (step 2). The program is returned to the step 1.

Figure 3:
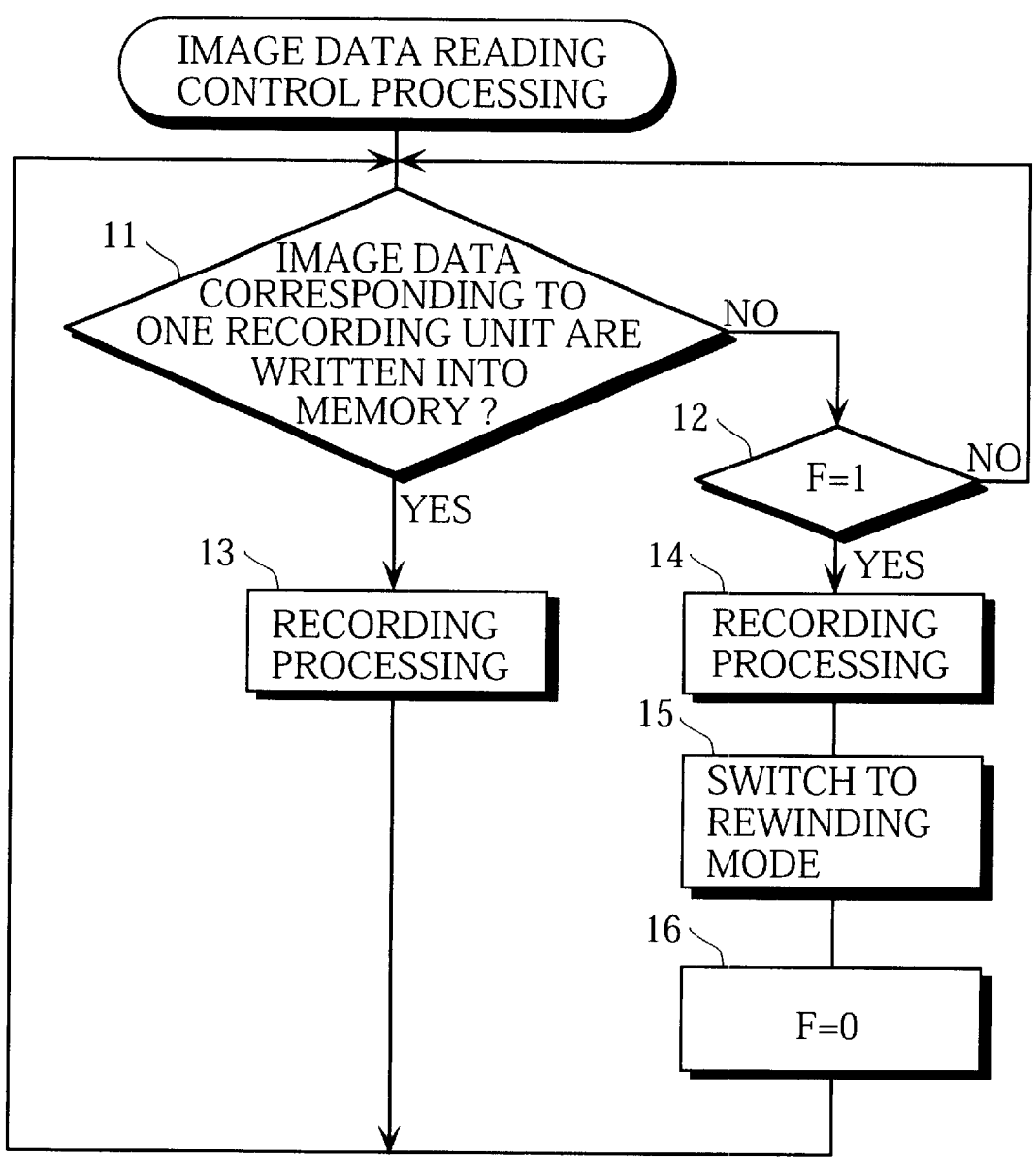
FIG. 3 is a flow chart showing the procedure for processing for controlling the reading of image data from a memory.

FIG. 3 shows the procedure for the processing for controlling the reading of the image data from the memory 2.

It is judged whether or not the image data corresponding to one recording unit are written into the memory 2 (step 11). That is, immediately after the VTR starts to operate in a recording mode, it is judged whether or not the image data corresponding to 240 fields are written into the memory 2. From this time on, it is judged whether or not the image data corresponding to 240 fields are written into the memory 2 after the previous recording processing on the video tape.

When the image data corresponding to one recording unit are not written, it is judged whether or not the flag F indicating that there is no remaining amount is set (step 12). If the flag F indicating that there is no remaining amount is not set (F=0), the program is returned to the step 11.

That is, when the image data corresponding to one recording unit are not written into the memory 2, and the flag F indicating that there is no remaining amount is not set, the processing at the steps 11 and 12 is repeatedly performed.

When it is judged at the step 11 that the image data corresponding to one recording unit are written into the memory 2, recording processing is performed (step 13). That is, the image data corresponding to one recording unit are successively read out of the memory 2, and are recorded on the video tape through the image compressing circuit 3, the error-correcting code adding circuit 4, the SYNC and other codes adding circuit 5, and the recording and coding circuit 6. When the recording processing is terminated, the program is returned to the step 11.

When the flag F indicating that there is no remaining amount is set at the step 12, it is judged that the remaining amount of the video tape is not more than the predetermined amount, so that recording processing is performed in order to record on the video tape all the image data which have not been recorded yet in the memory 2 (step 14). That is, all the image data which have not been recorded yet are successively read out of the memory 2, and are recorded on the video tape through the image compressing circuit 3, the error-correcting code adding circuit 4, the SYNC and other codes adding circuit 5, and the recording and coding circuit 6.

When the recording processing is terminated, the operation mode is temporarily switched to a rewinding mode in order to rewind the video tape to its beginning-of-tape (step 14) After the flag F indicating that there is no remaining amount is reset (F=0), the program is returned to the step 11.

The reason why the predetermined amount (a threshold value) at the step 1 in the processing for detecting the remaining amount of the tape is set to an amount slightly larger than the amount of the image data corresponding to one recording unit (the amount of the image data corresponding to 240 fields) will be described.

When it is judged at the step 1 that the remaining amount of the video tape is not more than the predetermined amount, the flag F indicating that there is no remaining amount is set. In the processing for controlling the reading of the image data, when it is judged that the flag F indicating that there is no remaining amount is set, all the image data which have not been recorded yet in the memory 2 (unrecorded image data) are recorded on the video tape in the recording processing at the step 14.

Consequently, as the remaining amount of the tape, a remaining amount enough to record the unrecorded image data, which are to be recorded on the video tape at the step 14, is required. Since the amount of the unrecorded image data, which are to be recorded on the video tape at the step 14, is not more than the amount corresponding to one recording unit. Therefore, the remaining amount corresponding to one recording unit is sufficient as the remaining amount of the tape required to record on the video tape the unrecorded data which are to be recorded on the video tape in the recording processing at the step 14.

The time point where it is judged that the remaining amount of the tape is not more than the predetermined amount may, in some cases, be during the recording processing at the step 13 in the processing for controlling the reading of the image data. In such a case, the sum of the amount of data recorded on the video tape in the recording processing at the step 13 after the remaining amount of the video tape is not more than the predetermined amount and the amount of data recorded on the video tape in the recording processing at the step 14 performed after that is required as the remaining amount of the tape.

In a case where it is judged that the remaining amount of the video tape is not more than the predetermined amount during the recording processing at the step 13, as the amount of data recorded on the video tape in the recording processing at the step 13 after the remaining amount of the tape is not more than the predetermined amount increases, amount of image data recorded on the video tape in the recording processing at the step 14 performed after that significantly decreases.

When it is judged that the remaining amount of the tape is not more than the predetermined amount immediately after the recording processing at the step 13 is started, the sum of the amount of the data recorded on the video tape in the recording processing at the step 13 from this time point on and the amount of the data recorded on the video tape in the recording processing at the step 14 performed after that reaches its maximum.

In this case, the amount of the data recorded on the video tape in the recording processing at the step 13 after the remaining amount of the tape is not more than the predetermined amount is the amount corresponding to one recording unit. On the other hand, the amount of the image data recorded on the video tape in the recording processing at the step 14 performed after that is the amount of the data written into the memory while the recording processing at the step 13 is performed, that is, not more than an amount corresponding to four fields. Consequently, the remaining amount of the tape in a case where the flag F indicating that there is no remaining amount is set is an amount corresponding to 244 fields (one recording unit plus four fields). The predetermined amount which is the threshold value may be set to an amount slightly larger than the amount corresponding to one recording unit.

Figure 4:
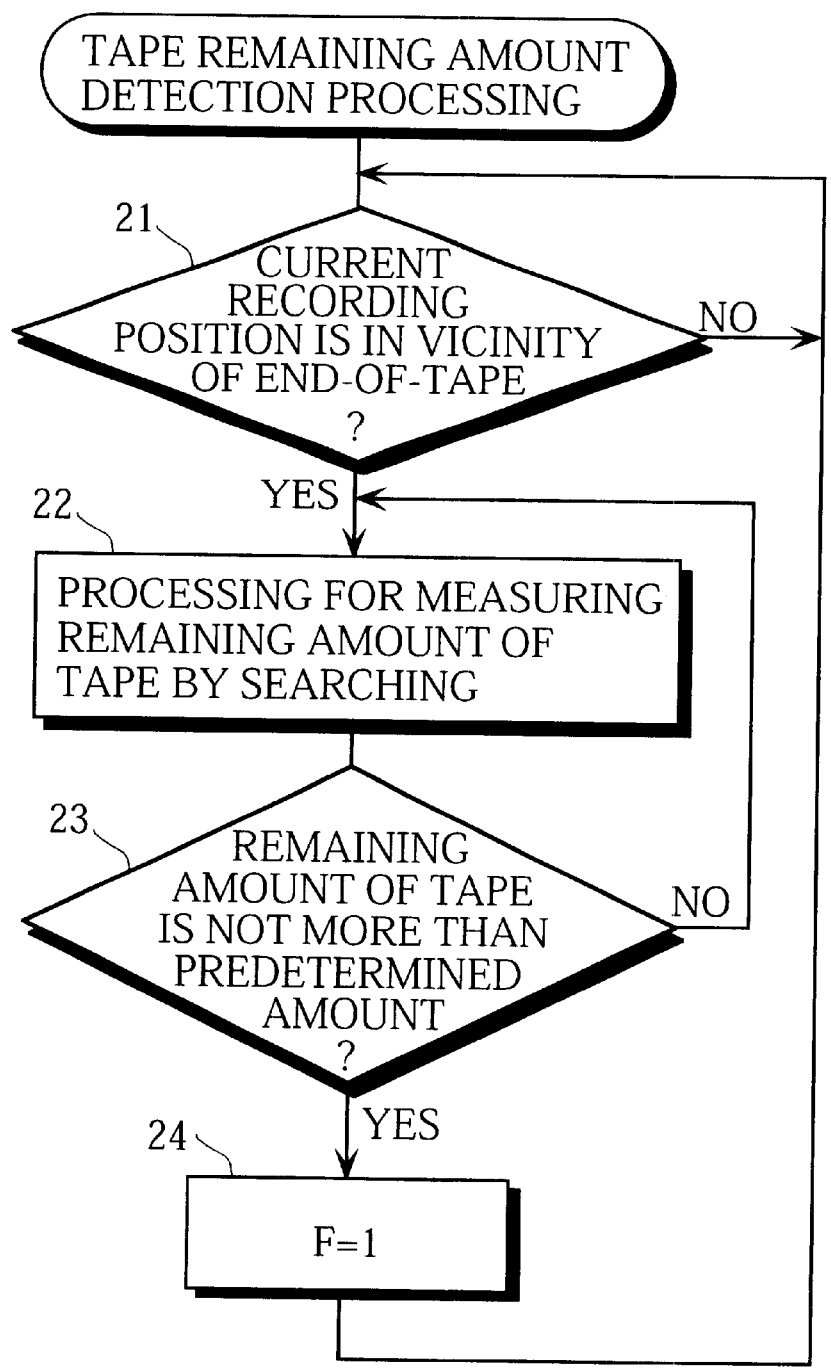
FIG. 4 is a flow chart showing another example of processing for detecting the remaining amount of a tape.

FIG. 4 illustrates another example of the processing for detecting the remaining amount of the tape.

It is roughly judged whether or not the current recording position on the video tape is in the vicinity of the end-of-tape on the basis of the ratio of the number of revolutions of the feed reel to the number of revolutions of the take-up reel (step 21). When the current recording position on the video tape is not in the vicinity of the end-of-tape, the program is returned to the step 21. That is, it is judged whether or not the current recording position on the video tape is in the vicinity of the end-of-tape at predetermined time intervals.

When it is judged that the current recording position on the video tape is in the vicinity of the end-of-tape, the processing for measuring the remaining amount of the tape by searching is performed (step 22). That is, the remaining amount of the video tape is measured by feeding the video tape to the end-of-tape as well as rewinding the video tape to its original position. When the image data is being recorded on the video tape, however, the processing for measuring the remaining amount by searching is performed after the recording processing is terminated.

When the processing for measuring the remaining amount of the tape is performed, it is judged whether or not the remaining amount of the tape is not more than a predetermined amount on the basis of the results of the measurement (step 23). The predetermined amount is set to an amount larger than an amount which is twice the amount of the image data corresponding to one recording unit (i.e., the amount of image data corresponding to 480 fields).

When the remaining amount of the video tape is more than the predetermined amount, the program is returned to the step 22. That is, the processing at the steps 22 and 23 is repeated until the remaining amount of the video tape is not more than the predetermined amount.

When it is judged at the step 23 that the remaining amount of the video tape is not more than the predetermined amount, the flag F indicating that there is no remaining amount is set (F=1) (step 24). The program is returned to the step 21.

When a memory having a capacity capable of storing data whose amount is larger than the amount corresponding to one recording unit is used as the memory, it is possible to omit the processing at the step 14 in the processing for controlling the reading of the image data shown in FIG. 3. That is, in a case where a memory having a capacity capable of storing data whose amount is larger than the amount corresponding to one recording unit is used as the memory, when it is judged at the step 12 that the flag F indicating that there is no remaining amount is set, the program may proceed to the step 15 without recording on the video tape image data which have not been recorded yet in the memory, to rewind the video tape.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital VTR comprising:

image data storage means for intermittently writing an image picked up by a video camera into a memory;

image data recording means for reading out, every time image data corresponding to a predetermined recording unit are stored in the memory, the image data corresponding to a recording unit from the memory, and recording the image data on a video tape;

detection means for detecting that the remaining amount of the video tape is not more than a predetermined amount; and means for automatically rewinding the video tape to its beginning-of-tape when it is detected that the remaining amount of the video tape is not more than the predetermined amount, the image data written into the memory while the video tape is being rewound being recordable on the video tape after the rewinding.

2. The digital VTR according to claim 1, wherein said detection means detects that the remaining amount of the video tape is not more than the predetermined amount on the basis of the ratio of the number of revolutions of a feed reel to the number of revolutions of a take-up reel.

3. The digital VTR according to claim 1, wherein said detection means measures the remaining amount of the video tape by feeding the video tape to its end-of-tape and rewinding the video tape to its original position when the image data is not recorded on the video tape, and detects that the remaining amount of the video tape is not more than the predetermined amount on the basis of the results of the measurement.

4. A digital VTR comprising:

image data storage means for intermittently writing an image picked up by a video camera into a memory;

image data recording means for reading out, every time image data corresponding to a predetermined recording unit are stored in the memory, the image data corresponding to a recording unit from the memory, and recording the image data on a video tape;

detection means for detecting that the remaining amount of the video tape is not more than a predetermined amount; and means for reading out, when it is detected that the remaining amount of the video tape is not more than the predetermined amount, all the image data, which have not been recorded yet, stored in the memory, recording the image data on the video tape, and then rewinding the video tape to its beginning-of tape, the image data written into the memory while the video tape is being rewound being recordable on the video tape after the rewinding.

5. The digital VTR according to claim 4, wherein said detection means detects that the remaining amount of the video tape is not more than the predetermined amount on the basis of the ratio of the number of revolutions of a feed reel to the number of revolutions of a take-up reel.

6. The digital VTR according to claim 4, wherein said detection means measures the remaining amount of the video tape by feeding the video tape to its end-of-tape and rewinding the video tape to its original position when the image data is not recorded on the video tape, and detects that the remaining amount of the video tape is not more than the predetermined amount on the basis of the results of the measurement.

* * * * *